(12) United States Patent
Kreutzer et al.

(10) Patent No.: US 12,072,005 B2
(45) Date of Patent: Aug. 27, 2024

(54) THREADED NUT OF A BALL SCREW DRIVE, AND METHOD FOR PRODUCING SAME

(71) Applicant: Schaeffler Technologies AG & Co. KG, Herzogenaurach (DE)

(72) Inventors: Mario Kreutzer, Sonneberg (DE); Richard Baier, Aurachtal (DE); Claus Pfeffer, Gerhardshofen (DE); Thomas Kandler, Herzogenaurach (DE); Bastian Kettler, Bubenreuth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/265,986

(22) PCT Filed: Nov. 3, 2021

(86) PCT No.: PCT/DE2021/100872
§ 371 (c)(1),
(2) Date: Jun. 8, 2023

(87) PCT Pub. No.: WO2022/122069
PCT Pub. Date: Jun. 16, 2022

(65) Prior Publication Data
US 2024/0035554 A1    Feb. 1, 2024

(30) Foreign Application Priority Data
Dec. 9, 2020 (DE) ............. 10 2020 132 816.8

(51) Int. Cl.
*F16H 25/24* (2006.01)
*B21D 53/24* (2006.01)
(Continued)

(52) U.S. Cl.
CPC ............ *F16H 25/24* (2013.01); *B21D 53/24* (2013.01); *B21H 3/08* (2013.01); *F16H 25/2214* (2013.01);
(Continued)

(58) Field of Classification Search
CPC ................ F16H 25/24; F16H 25/2214; F16H 2025/2481; F16H 2025/249;
(Continued)

(56) References Cited

U.S. PATENT DOCUMENTS

| 2,441,580 A | 5/1948 | Mageoch |
| 3,722,312 A * | 3/1973 | Better .............. F16H 25/2209 74/89.42 |

(Continued)

FOREIGN PATENT DOCUMENTS

| DE | 4131486 A1 | 3/1993 |
| DE | 10062982 A1 | 6/2002 |

(Continued)

*Primary Examiner* — Victor L MacArthur

(57) ABSTRACT

The disclosure relates to a threaded nut of a ball screw drive. The threaded nut includes an inner sleeve made of sheet metal and an outer sleeve made of sheet metal. The inner and outer sleeves are nested axially in one another to form a nut sleeve. A thread of the nut sleeve is helically wound about a longitudinal axis of the threaded nut and forms a ball groove on the inner circumference of the inner sleeve. The outer sleeve is provided along the thread with at least one outer hole into which material of the inner sleeve is molded.

20 Claims, 6 Drawing Sheets

(51) Int. Cl.
  *B21H 3/08*      (2006.01)
  *F16H 25/22*     (2006.01)
(52) U.S. Cl.
  CPC ............ *F16H 2025/2481* (2013.01); *F16H 2025/249* (2013.01)
(58) Field of Classification Search
  CPC ... F16H 25/2223; B21D 53/24; B21D 22/025; B21D 39/04; B21H 3/08
  See application file for complete search history.

(56) References Cited

U.S. PATENT DOCUMENTS

| | | | |
|---|---|---|---|
| 4,074,587 A | | 2/1978 | Brusasco |
| 6,497,030 B1 * | | 12/2002 | Marando ............ B21D 26/051 29/523 |

FOREIGN PATENT DOCUMENTS

| | | |
|---|---|---|
| DE | 102011081966 A1 | 3/2013 |
| DE | 102016209119 A1 | 11/2017 |
| DE | 102018217960 A1 | 4/2020 |
| DE | 102019114276 A1 | 12/2020 |
| EP | 1226373 B1 | 7/2003 |
| FR | 2191676 A5 | 2/1974 |
| GB | 2000848 A | 1/1979 |
| WO | 2013029842 A1 | 3/2013 |
| WO | 2020239164 A1 | 12/2020 |

* cited by examiner

THREADED NUT OF A BALL SCREW DRIVE, AND METHOD FOR PRODUCING SAME

CROSS-REFERENCE TO RELATED APPLICATIONS

This application is the U.S. National Phase of PCT Application No. PCT/DE2021/100872 filed on Nov. 3, 2021, which claims priority to DE 10 2020 132 816.8 filed on Dec. 9, 2020, the entire disclosures of which are incorporated by reference herein.

TECHNICAL FIELD

The present disclosure relates to a threaded nut of a ball screw drive.

BACKGROUND

Ball screw drives convert a relative rotation of the threaded nut and threaded spindle into a relative displacement of the threaded nut and threaded spindle. Balls are arranged between the threaded spindle and the threaded nut in a ball channel which is wound helically about a spindle axis and is delimited by ball grooves which are helically wound about the spindle axis and which are formed on the threaded nut and on the threaded spindle. In most designs, the ball channels are endless; they are made of a load section and a return section that connects a start to an end of the load section. The load section is formed by the ball grooves of the threaded spindle and the threaded nut. The return section is formed depending on the type of ball screw drive. The threaded nut is usually provided with through-holes on the lateral surface thereof, into which, in the case of a single deflection, deflector pieces, or in the case of an external deflection, deflection tubes are inserted at the ends. In the case of single deflection, the deflector piece connects one end of a turn of the load section to a beginning of said turn. In the case of external deflection, the deflection tube or deflection element connects a start of a first turn of the load section to an end of a last turn of the load section. Consequently, the load section can comprise several turns.

Ball screw drives are known, for example, from DE 10 2016 209 119 A1, the threaded nut of which is made of sheet metal and is provided with a ball groove produced by forming technology through thread forming. A connecting part formed by a flange is formed in one piece on an axial end of the sleeve-shaped threaded nut to connect the threaded nut to a machine part.

In numerous applications, the threaded nuts are permanently connected to machine parts and should be easily weldable, for example. The ball grooves of the threaded nuts should be easily hardenable. These different requirements for the material properties must be taken into account when selecting materials. The restrictions in the selection of materials resulting from the requirements can lead to considerable effort in the production of the threaded nut. For example, if good weldability is a priority, carburization is required for heat treatment to provide sufficient hardness.

SUMMARY

It was the object of the present disclosure to specify a threaded nut of a ball screw drive which can be produced particularly economically.

The threaded nut of a ball screw drive is provided with an inner sleeve made of sheet metal and with an outer sleeve made of sheet metal, which are axially nested in one another to form a nut sleeve. The two sleeves can be joined together so that the lateral surfaces thereof facing one another rest against one another without play. The nut sleeve has a thread helically wound about an axis of the threaded nut, which thread forms a ball groove on the inner circumference of the inner sleeve.

The ball groove of the threaded nut, together with a helical ball groove of a threaded spindle of the ball screw drive, forms a load section of a ball channel in which the balls—in the case of a ball screw drive with ball return—circulate endlessly.

The outer sleeve is provided with at least one outer hole along the thread. The outer hole(s) can already be punched on the outer sleeve before both sleeves are nested together.

Material of the inner sleeve is molded into the outer hole of the outer sleeve. The material of the inner sleeve can be molded into the outer hole of the outer sleeve with a forming tool that acts on the inner circumference of the inner sleeve from radially inside and deforms the material thereof.

This threaded nut enables a function-related selection of steels for the inner sleeve and the outer sleeve. The outer sleeve can be formed, for example, from an easily weldable sheet steel. The inner sleeve can be made of an easily hardenable sheet steel. The sleeves, which can be made of sheet steel of different alloys, can be nested and joined together as a nut sleeve.

In addition, the engagement of the material of the inner sleeve in the outer hole of the outer sleeve ensures that the two sleeves are arranged relative to one another so that they cannot rotate. Securing the rotational position of the two sleeves to one another facilitates possible further processing steps on the nut sleeve and enables the provision of a threaded nut, which is necessary for the correct functioning of the ball screw drive. In ball screw drives with ball return with several endless ball passages, dead travel sections are formed between adjacent endless ball passages into which no balls can travel. To further improve a non-rotatable connection between the two sleeves, it can be advantageous to place one or more of these outer holes in the dead travel section.

The ball groove can be formed on the inner sleeve made of sheet metal, wherein material of the inner sleeve is displaced into the outer hole of the outer sleeve by the ball groove being molded. The production of the ball groove by forming technology is easily controllable and can be done inexpensively by means of roller burnishing or thread forming. Furthermore, under this forming of the nut sleeve, the displacement of material is used to provide a non-rotatable connection of the two nested sleeves.

Material of the inner sleeve flows under the forming force into the outer hole of the outer sleeve and ensures a positive connection between the two sleeves in the circumferential direction. When the forming tool forms the inner sleeve along the thread, material from the inner sleeve flows into the hole in the outer sleeve due to the lack of radial support on the outer lateral surface thereof. At this point on the circumference, the inner sleeve with the casing thereof deviates radially outward.

The hole in the outer sleeve can be covered by the casing of the inner sleeve, the material of which is formed in this hole. If the thread is made in a forming process with a forming tool that forms the ball groove on the inner circumference of the inner sleeve, material from the inner sleeve flows into the hole in the outer sleeve because the inner sleeve is not radially supported at this point and the sleeve casing of the inner sleeve is deformed slightly radially outwards.

In an example embodiment, the threaded nut is provided for a ball screw drive with a ball return. Multiple holes in the threaded nut can be required to provide this ball screw drive with ball return. In the case of the single deflection mentioned above, one hole is required for each deflector piece, which endlessly connects one end to the start of a common turn of the load section of the ball channel. In the case of an external deflection, there are two respective holes into which the ends of a deflection element arranged on the outer circumference of the nut sleeve engage, which endlessly connects an end of a last turn with a start of a first turn of the load section.

In the case of ball return, the nut sleeve has a nut sleeve which has at least one through-hole for the return of balls along the thread, which is formed by an inner hole of the inner sleeve and by the outer hole of the outer sleeve. Inner sleeve material at the edge of the inner hole is molded into the outer hole. Under the forming force, a deformed rim section forms at the edge of the inner hole, which forms a ball inlet ramp in the ball groove at the end of the load section. Such ball inlet ramps, which are known per se, are used for the gradual (un)loading of the balls when they get out of the load section into the return section of the endless ball channel or vice versa. These ball inlet ramps at the transition between the ball groove to the edge of the inner hole only extend a few hundredths of a millimeter in the circumferential direction and in the radial direction. In a further development, these ball inlet ramps can be formed when the forming tool forms the thread with the ball groove.

The through-hole can have a larger outer hole on the outer sleeve and a smaller hole on the inner sleeve. The outer hole is slightly wider in the axial direction and longer in the circumferential direction than the inner hole. In this way, on the one hand, a possible punching of the inner hole is facilitated, and on the other hand, space is created for inserting a deflection tube of an outer deflection into the outer hole of the outer sleeve. It also makes it easier to provide the ball inlet ramp on the inner sleeve.

The inner hole(s) can be punched or cut after the two sleeves have been joined together and the thread with the ball groove has been formed on the nut sleeve. Since only the wall thickness of the inner sleeve has to be penetrated to provide the through-hole, the applied tool forces can be reduced to such an extent that undesired deformations of the nut sleeve do not occur.

Multiple holes in the threaded nut can be required to provide this ball screw drive with ball return. In the case of the single deflection mentioned above, one hole is required for each deflector piece, which endlessly connects one end to the start of a common turn of the load section of the ball channel. In the case of an external deflection, there are two holes in each case into which the ends of a deflection element arranged on the outer circumference of the nut sleeve engage, which endlessly connects an end of a last turn with a start of a first turn of the load channel.

First, several outer holes can be made in the outer sleeve, possibly by punching. Punching the outer holes is technically easy to do. After the thread has been provided, the inner holes can be introduced into the inner sleeve, so that through-holes are formed in the nut sleeve, which are set up for receiving the deflector pieces or deflection elements mentioned.

The threaded nut can be provided with a connecting component on at least one axial end of the nut sleeve; for example, the inner sleeve and/or the outer sleeve can be connected to a flange or a bearing ring.

The inner sleeve and/or the outer sleeve can be made of sleeve parts arranged to be axially adjacent. This can be expedient if, for example, one sleeve part merges monolithically into a bearing ring of a deep-groove ball bearing and a different core hardness is required for this bearing ring compared to the sleeve.

One sleeve part can be made in one piece—i.e., monolithically—with the connection component. Deep-drawn sleeve parts with the connecting components described can be provided in a particularly economical manner.

A method for producing the threaded nut described can be carried out according to the following steps:

The outer sleeve made of sheet metal is provided with one or more outer holes. The holes can be punched. The outer sleeve made of sheet metal and the inner sleeve made of sheet metal are axially nested in one another as a nut sleeve. The two sleeves can be joined together so that they are arranged one inside the other without play. This nut sleeve can be inserted into a die and supported therein in the radial direction. A forming tool moves into the nut sleeve and forms the helically wound thread about the longitudinal axis in the nut sleeve, which thread forms the helically wound ball groove of the threaded nut on the inner circumference of the nut sleeve. A thread forming tool can be used as a forming tool, or a roller burnishing tool for larger diameters of the threaded nut. This forming tool forms inner sleeve material into the outer hole of the outer sleeve. The material of the inner sleeve yields radially outward to the forming force of the forming tool in the area of the outer hole and flows into the outer hole. The material of the inner sleeve can be molded into the outer hole to form a deformed edge section in the region of an edge of the outer hole.

After completing these method steps, the threaded nut can be removed from the die and hardened in a heat treatment process.

BRIEF DESCRIPTION OF THE DRAWINGS

In the following, the disclosure is explained in more detail on the basis of three exemplary embodiments illustrated in a total of 11 figures.

In the figures.

DETAILED DESCRIPTION

Figure 1:
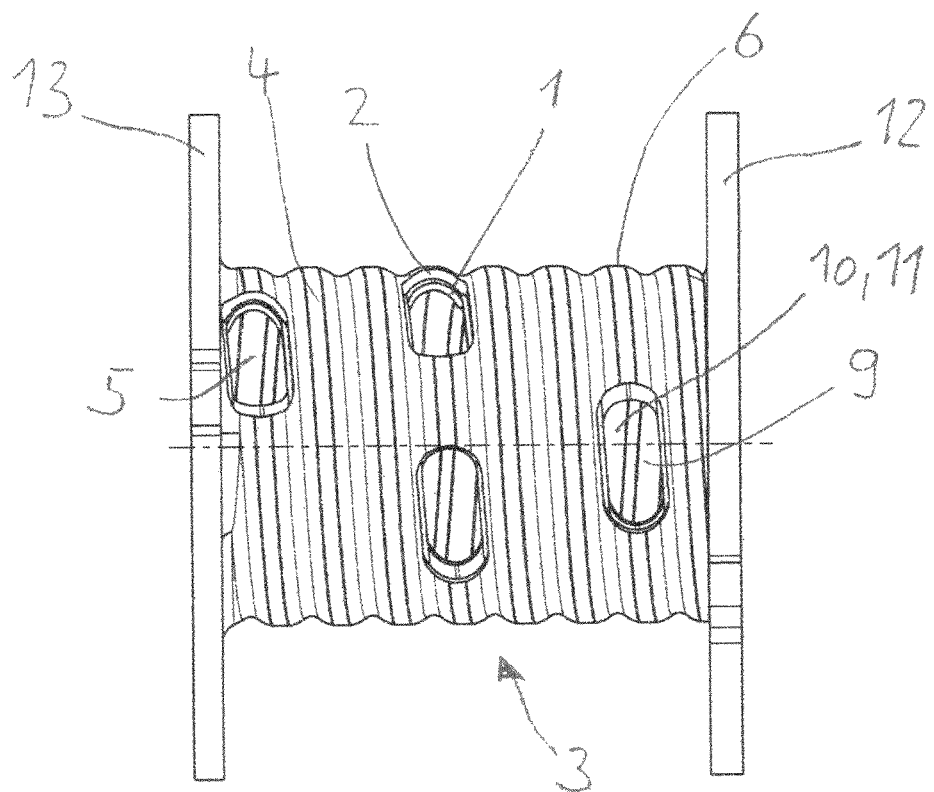
FIG. 1 shows a view of a first variant of a threaded nut.

The threaded nut of a ball screw drive with external deflection shown in FIG. 1 is provided with an inner sleeve 1 made of sheet metal and an outer sleeve 2 made of sheet metal, which are nested axially in one another to form a nut sleeve 3.

A ball screw drive with external deflection has an endless ball channel, which is made of a load section and a return section. In the load section, balls roll under load on the ball grooves 5 of the threaded nut and the threaded spindle (not shown). In the return section, the balls are returned with no load from an end of the load section to a beginning of the load section. The load section winds around the spindle axis for more than one turn. A deflection element (not shown) is used for this purpose. In the case of an external deflection, two holes for each endless ball channel are formed in the casing of the threaded nut, into which the ends of a deflection element—not shown here—arranged on the outer circumference of the nut sleeve engage, which deflection element has a return section for the balls, and one end of a last turn endlessly connects to a beginning of a first turn of the load section.

The nut sleeve 3 is provided with a thread 4 helically formed about a longitudinal axis of the threaded nut, which forms a ball groove 5 helically wound about the longitudinal axis of the threaded nut on the inner circumference of the nut sleeve 3 and a helically wound outer ridge 6 on the outer circumference of the nut sleeve 3.

The ball groove 5 of the threaded nut, together with a helical ball groove of a threaded spindle of the ball screw drive, not shown here, forms a load section of a ball channel in which the balls circulate endlessly.

This threaded nut enables a function-related selection of steels for the inner sleeve 1 and the outer sleeve 2. The outer sleeve 2 can be formed, for example, from an easily weldable sheet steel if the threaded nut is to be welded to a machine part. The inner sleeve 1 can be made of sheet steel that is easily hardenable, which enables the ball groove 5 to be sufficiently hard for the balls.

Figure 5:
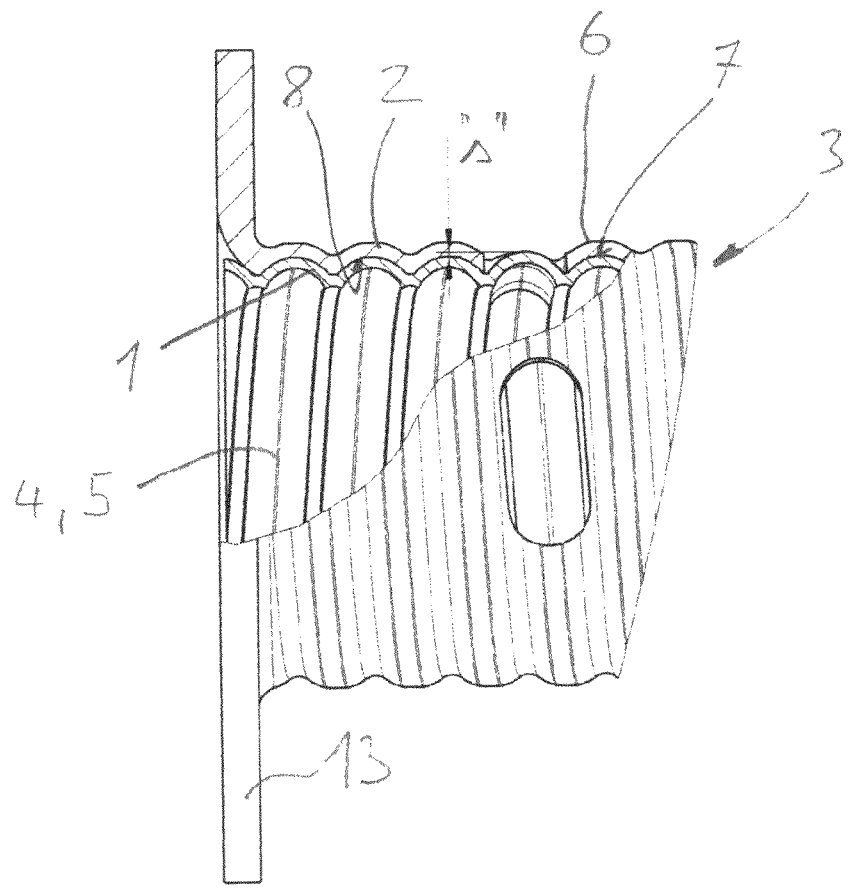
FIG. 5 shows the nut sleeve from FIG. 2 with a formed thread in partial section.

The thread 4 formed in the nut sleeve 3 causes a positive engagement of the inner sleeve 1 and the outer sleeve 2 with one another with regard to an axial load on the threaded nut. Seen in a longitudinal section through the thread of the threaded nut, the two casings of the sleeves 1, 2 are arched along the thread 4 and engage with one another. A convex curvature of the inner sleeve 1 engages in a concave curvature of the outer sleeve 2 along the thread 4 (FIG. 5).

On the outer circumference of the inner sleeve 1 there is an inner ridge 7 which is helically wound about the longitudinal axis and is convexly curved. A helically wound groove 8 is formed on the inner circumference of the outer sleeve 2, into which the inner ridge 7 of the inner sleeve 1 engages.

In this exemplary embodiment, four through-holes 9 distributed over the circumference are formed along the thread 4 for the return of balls, with two of these through-holes 9 being provided for a deflection element. Each through-hole 9 is formed by an inner hole 10 of the inner sleeve 1 and an outer hole 11 of the outer sleeve 2.

Both sleeves 1, 2 are made in one piece at the ends thereof facing away from each other, each with a radial flange 12, 13. These radial flanges 12, 13 are connecting components 31 for connecting the threaded nut to machine parts.

Figure 2:
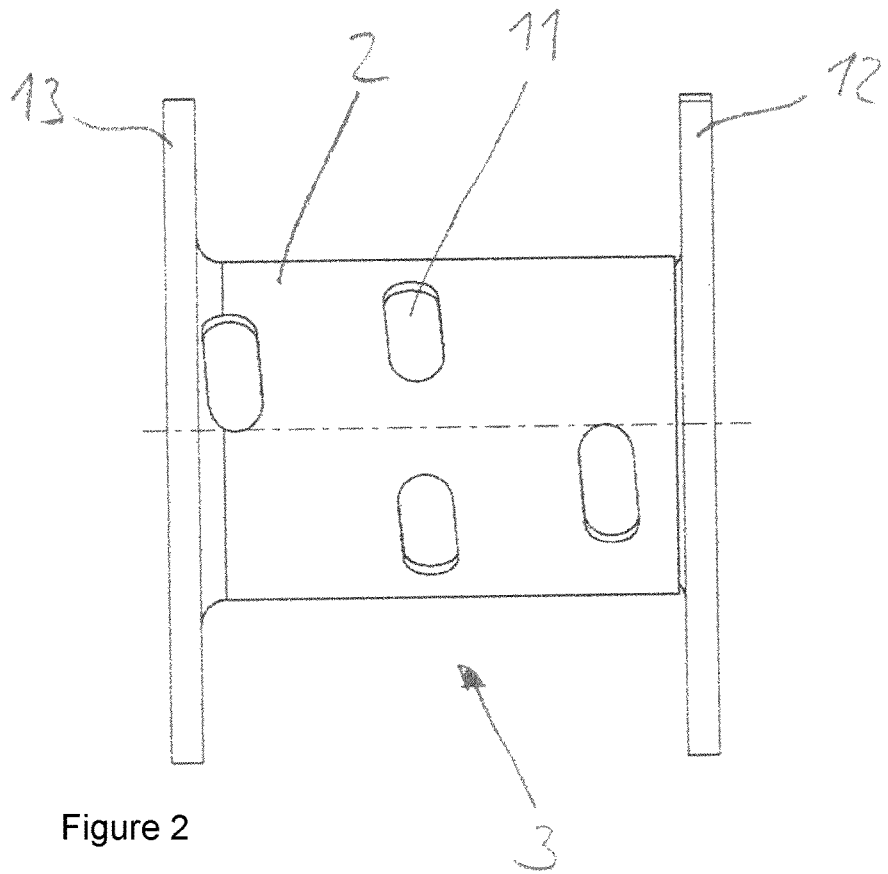
FIG. 2 shows a view of a nested nut sleeve.

FIG. 2 shows the nut sleeve 3 with the nested sleeves 1, 2, which here have smooth-cylindrical lateral surfaces and are produced in one piece with the radial flanges 12, 13. Only in the outer sleeve 2 are the outer holes 11 punched.

Figure 3:
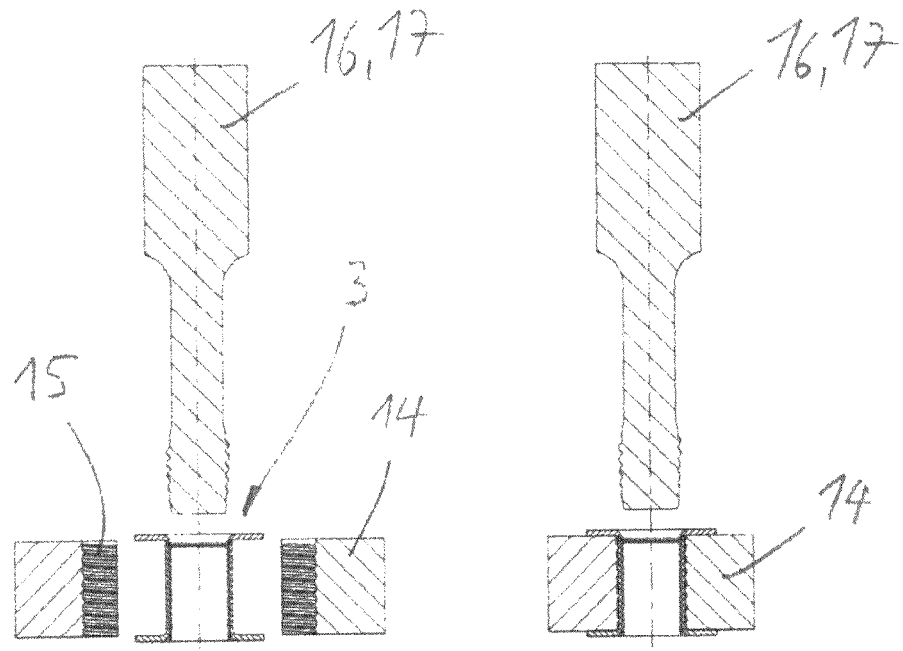
FIGS. 3 and 4 show a method for further processing of the nut sleeves from FIG. 2.
Figure 4:
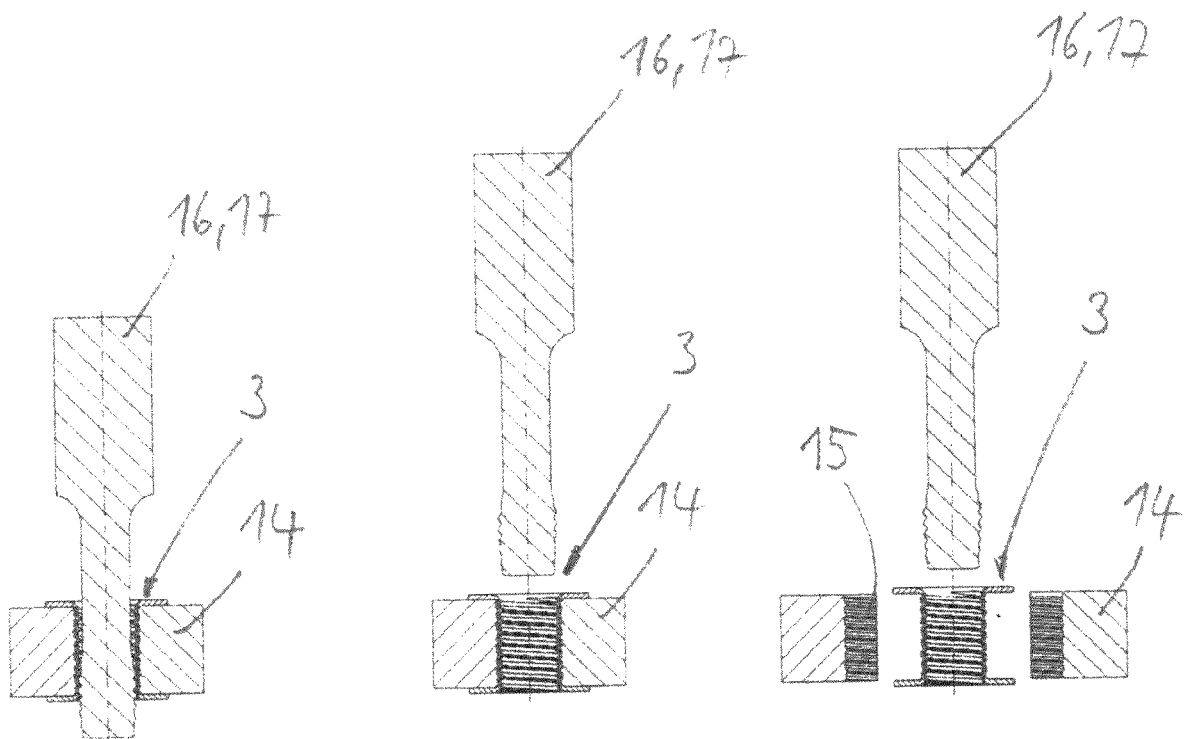

The introduction of the thread 4 is explained with reference to FIGS. 3 and 4. According to FIG. 2, the nut sleeve 3—only shown in sketched form here, omitting the outer holes—is inserted into a die 14, on the inner circumference of which a groove 15 on the die side helically wound about the axis of the threaded nut is formed. This groove 15 on the die side has the slope of the ball groove 5, which is formed in the manner described below. The multi-part die 14 is opened radially for inserting the nut sleeve 3 provided with radial flanges 12, 13; this means that the die parts move away from each other so that the nut sleeve 3 can be inserted (FIG. 3, left) and then the die 14 is closed again (FIG. 3, right).

A forming tool 16 moves into the nut sleeve 3 (FIG. 4, left) and forms the thread 4 in the nut sleeve 3 which is helically wound about the longitudinal axis, which forms the helically wound ball groove 5 of the threaded nut on the inner circumference of the nut sleeve 3, and which forms the helically wound outer ridge 6 along the thread 4 on the outer circumference of the nut sleeve 3 which flows into the groove 15 on the die side. After forming a thread, the thread former 16 moves out of the nut sleeve 3 (FIG. 4, center) and the die 14 is opened again (FIG. 4, right).

A thread former 17, which is arranged to be coaxial to the axis of the threaded nut and rotates about the axis thereof and forms the thread 4 with axial feed, can be used as the forming tool 16 in this exemplary embodiment. Alternatively, in the case of large internal diameters of the threaded nut, roller burnishing tools can be used, the rollers of which form the thread with the ball groove.

The thread former 17 is in direct contact with the inner sleeve (FIG. 4, left); the acting forming force creates the ball groove 5 and deforms the casing of the inner sleeve 1 along the thread 4 to form the inner ridge 7, which under the acting circumferential force forms the outer sleeve 2 along the thread 4, so that the helically wound groove 8 is formed on the inner circumference of the outer sleeve 2 and the outer ridge 6 is formed on the outer circumference of the outer sleeve 2. The inner ridge 7 of the inner sleeve 1 engages in the groove 8 of the outer sleeve 2 and the outer ridge 6 of the outer sleeve 2 engages in the groove 15 on the die side, i.e., under the forming force of the thread former 17, the material of the nut sleeve 3 flows into the groove 15 on the die side.

FIG. 5 shows the nut sleeve 3 provided in this manner, which has a form fit between the two sleeves 1, 2 in the axial direction due to the thread engagement. There is a sufficiently large frictional contact between these two sleeves 1, 2, so that both sleeves 1, 2 are arranged in a non-rotatable manner in the circumferential directions.

Figure 8:
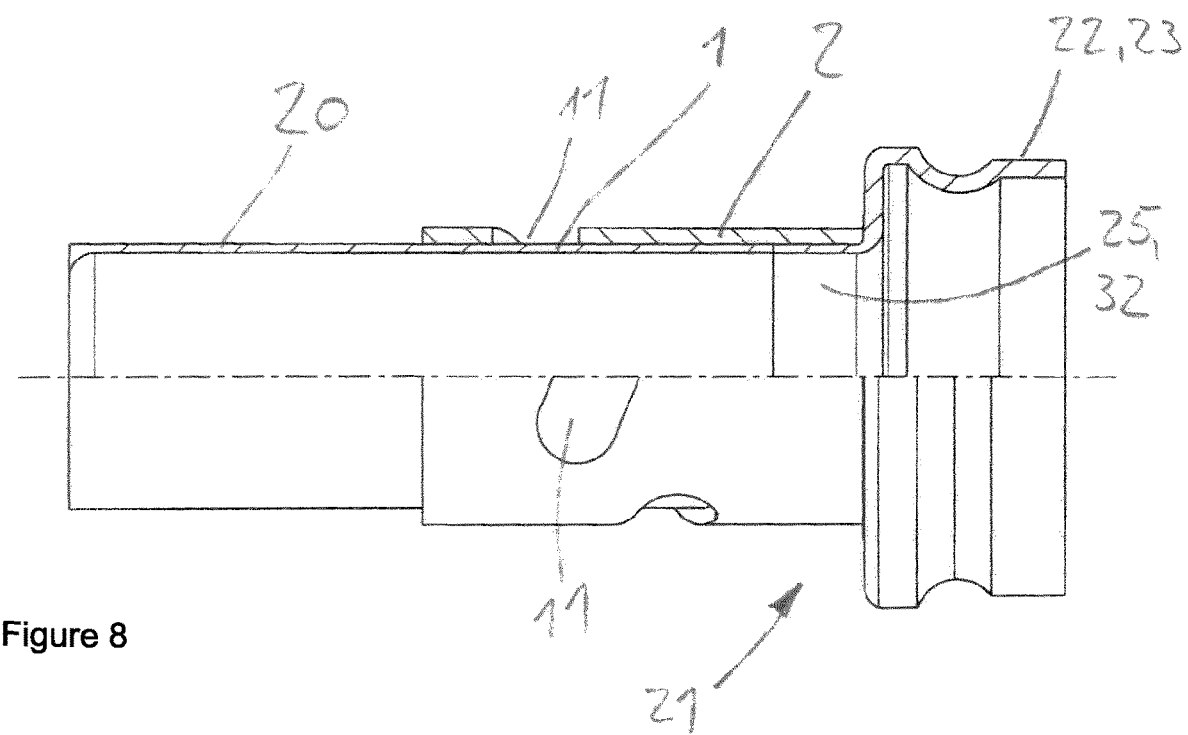
FIG. 8 shows a view of a second variant of a nested nut sleeve of the threaded nut.

While the thread 4 is being formed, material from the inner sleeve 1 flows into the outer holes 11 of the outer sleeve 2 because the inner sleeve 1 is not radially supported at these points and the sleeve casing of the inner sleeve 1 is deformed radially slightly outwards under the force of the forming tool. In FIG. 8, the overhang with which the inner sleeve 1 engages in the outer hole 11 is indicated with "s".

The inner holes 10 are now punched or milled (FIG. 6) into the nut sleeve 3 prepared in this way, so that the through-holes 9 are formed.

Figure 6:
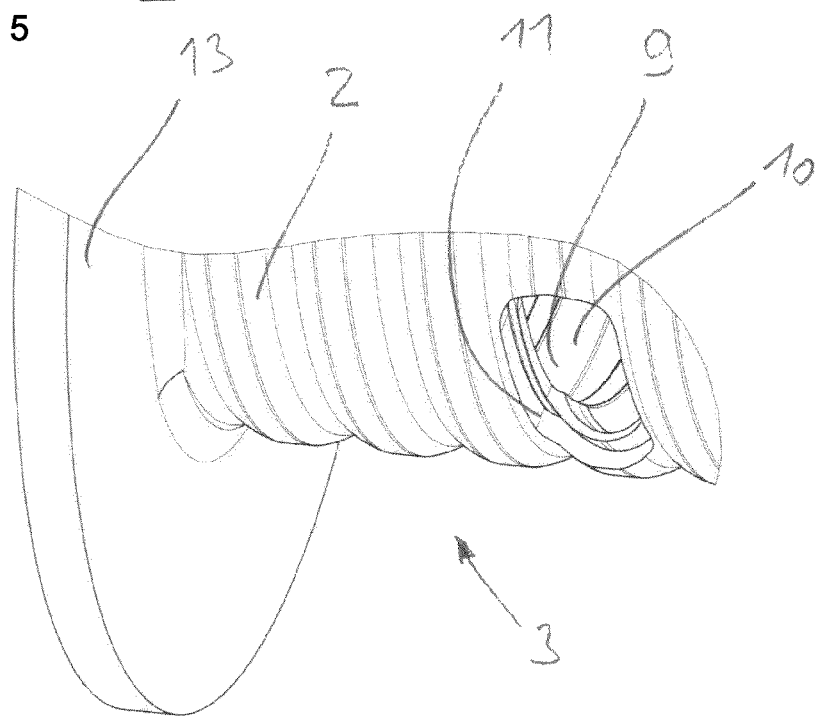
FIG. 6 shows a section of the threaded nut of FIG. 1 in a perspective representation.
Figure 7:
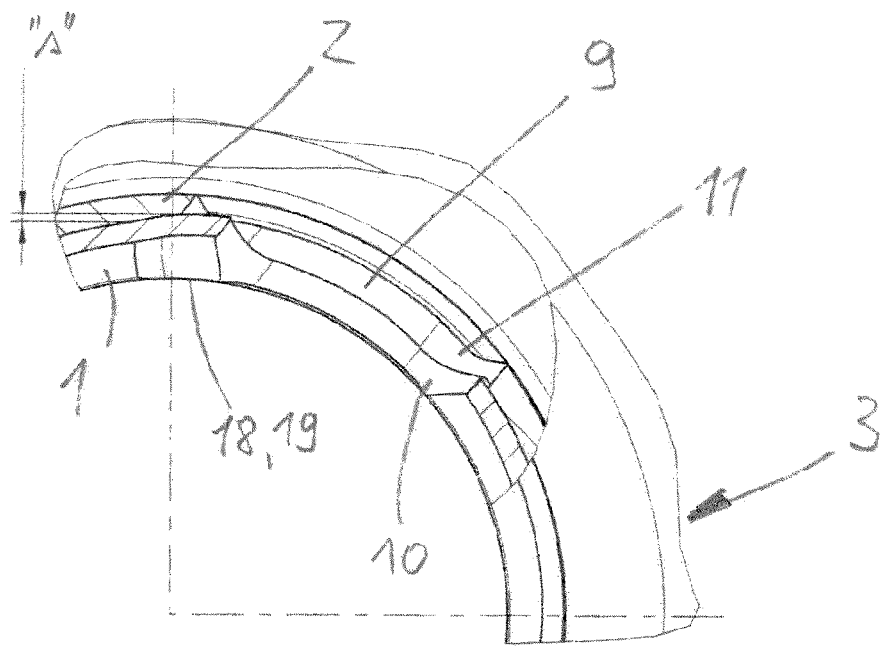
FIG. 7 shows a cross-section through a part of the threaded nut from FIG. 1.

FIGS. 6 and 7 show the through-holes 9 in different representations. It can be clearly seen from FIG. 7, for example, that the outer hole 11 is larger than the inner hole 10, both in the axial and in the circumferential direction. The lateral surface of the outer hole 11 is outside the clear opening of the inner hole 10.

The inner holes 10 are consequently punched or cut after the two sleeves 1, 2 are joined together and the thread 4 with the ball groove 5 is formed onto the nut sleeve 3. Since only the wall thickness of the inner sleeve 1 has to be penetrated to provide the through-hole 9, the applied tool forces can be reduced to such an extent that undesired deformations of the nut sleeve 3 do not occur. The somewhat smaller inner hole 10 allows for easier punching out, because the tool can be dimensioned to be correspondingly small, so that the outer sleeve 2 is not touched on the perforated casing thereof delimiting the outer hole 11.

Even after the inner holes 10 have been punched or cut, the material of the inner sleeve 1 engages into the outer hole 11 of the outer sleeve 2. The forming of material supports a non-rotatable connection of the two nested sleeves 1, 2, because this forming means an engagement of the inner sleeve 1 in the outer sleeve 2, so that there is a positive connection between the two sleeves 1, 2 in the circumferential direction.

By forming the thread 4 onto the nut sleeve 3 as described above and forming the material of the inner sleeve 1 into the outer hole 11, a formed edge section 18 (FIG. 7) is created, which leaves the circular arc shape of the ball groove 5 radially outwards and forms a ball inlet ramp 19, which serves for the gradual loading and unloading of balls that come from the return section into the load section of the endless ball channel, or vice versa. These ball inlet ramps 19 at the transition between the ball groove 5 to the edge of the inner hole 10 only extend a few hundredths of a millimeter in the circumferential direction and in the radial direction. These ball inlet ramps 19 are formed when the forming tool forms the thread 4 with the ball groove 5.

Figure 9:
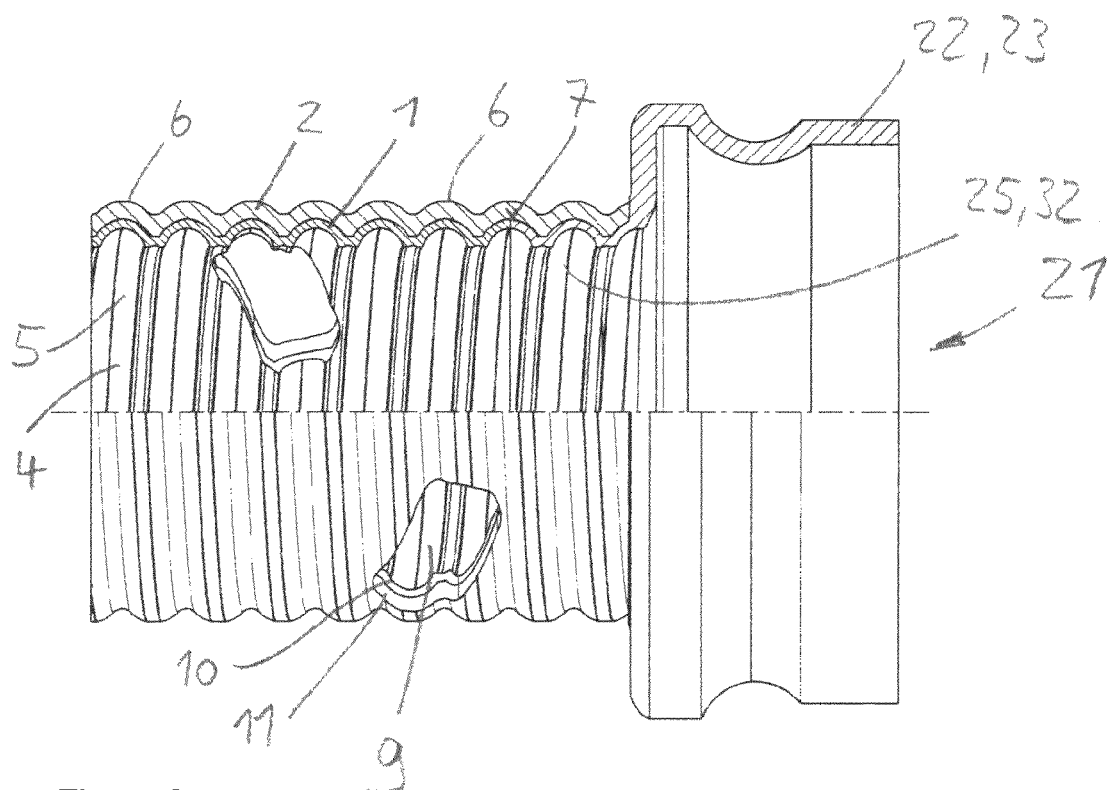
FIG. 9 shows the finished threaded nut according to FIG. 8 in a longitudinal half section.

FIGS. 8 and 9 show a second variant of the threaded nut for a ball screw drive with single deflection. The sleeves 1, 2 nested to form a nut sleeve 21 are initially still smoothly cylindrical (FIG. 8) and only the outer sleeve 2 is provided with outer holes 11 distributed over the circumference. The inner sleeve is extended axially to form a clamping section 20, with which the nut sleeve 3 can be clamped for punching out the inner holes, which can be seen in FIG. 9. The inner sleeve 1 covers the outer holes 11 with the cylindrical lateral surface thereof. The shape and location of the outer holes 11 differs somewhat from the shape and location of the outer holes of the threaded nut for a ball screw drive with external deflection described above.

The thread 4 and the inner holes 10 are produced in the same way as was described for the first variant, wherein the nut sleeve 21 is clampable with the clamping section 20 thereof in a holder (not shown) for stamping. The clamping section 20 can later be separated.

As in the first variant, the outer holes 11 are slightly larger than the inner holes 10. A ball inlet ramp is also created.

The nut sleeve 3 is connected to a bearing ring 22 as a connecting component 23 instead of a radial flange. The bearing ring 22 is part of a four-point bearing (not shown here) with a main load direction to rotatably mount the threaded nut on a machine part. At one axial end, the bearing ring 22 has a hollow-cylindrical socket 25 formed thereon, the diameter of which corresponds to that of the inner sleeve 1 and engages in the outer sleeve 2 to be axially adjacent to the inner sleeve 1. The socket 25 can also be referred to as a sleeve part 32 of a multi-part inner sleeve 1.

Furthermore, in this exemplary embodiment, the through-holes are designed for a ball screw drive with single deflection. In the case of the single deflection, a deflector piece is inserted into the through-hole, which endlessly connects an end of the load section with a beginning of the load section of a common turn.

In this exemplary embodiment as well, the outer hole 11 is somewhat larger than the inner hole 10.

Figure 10:
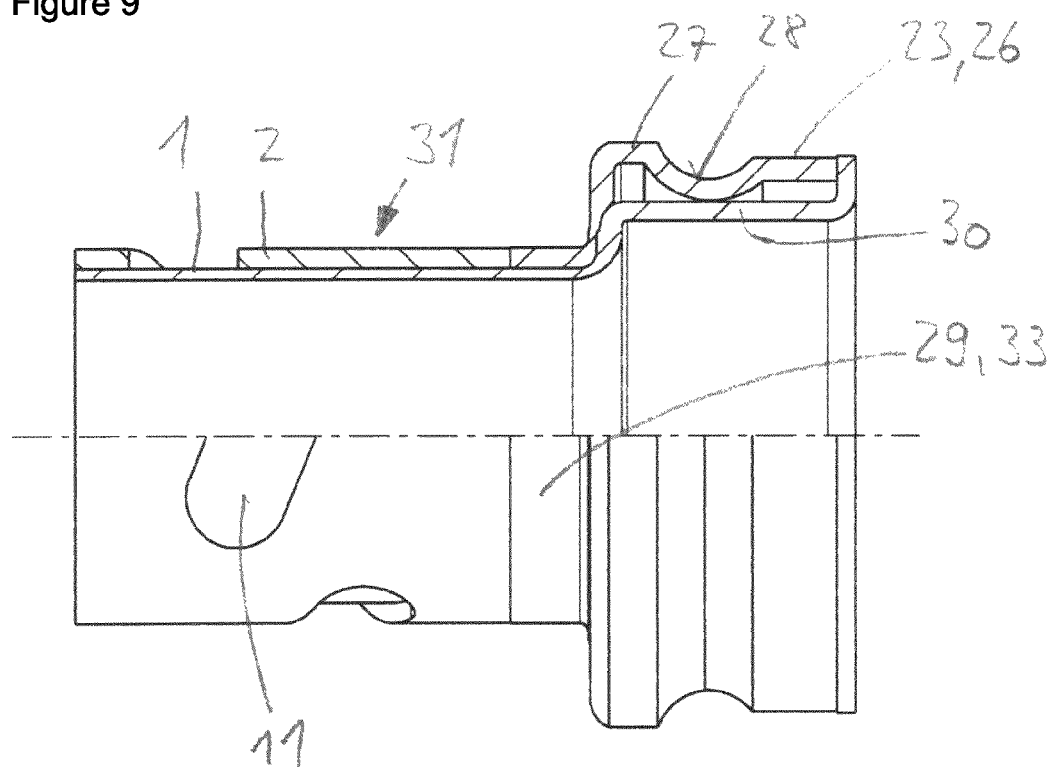
FIG. 10 shows a third variant of the nut sleeve in a longitudinal half section.
Figure 11:
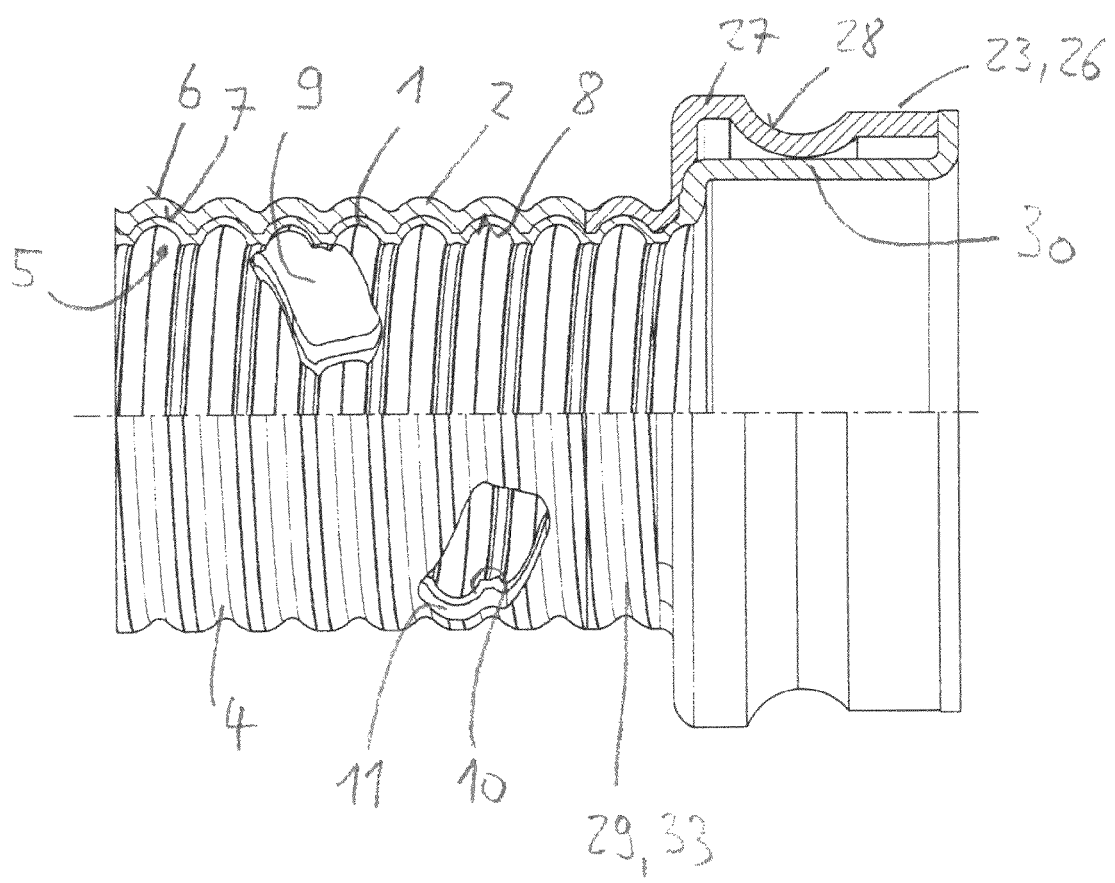
FIG. 11 shows the threaded nut produced from the nut sleeve in FIG. 10.

The third variant of a threaded nut shown in FIGS. 10 and 11 differs from the threaded nut according to the second exemplary embodiment only in that the connecting component 23 is formed by a modified bearing ring 26, and that a nut sleeve 31 with the outer sleeve 2 thereof is built somewhat shorter at one axial end than the inner sleeve 2.

This bearing ring 26 is designed in several parts; it has an outer ring part 27 with a ball groove 28 of a deep groove ball bearing, at one axial end of which a tubular socket 29 is formed, the diameter of which corresponds to the diameter of the outer sleeve 2 and which is arranged to be axially adjacent to the outer sleeve 2, and on which the thread 4 is also formed. The tubular socket 29 can be referred to as the sleeve part 33 of the multi-part outer sleeve 2.

The inner sleeve 1 is provided at the axial end thereof facing the bearing ring 26 with a monolithically formed support ring 30, on the outer lateral surface of which the outer ring part 27 is radially supported. The bearing ring 30 can be used to drive the threaded nut.

FIG. 10 shows the situation before the inner holes are machined into the inner sleeve 1. FIG. 11 shows the finished through-holes 9.

LIST OF REFERENCE SYMBOLS

1 Inner sleeve
2 Outer sleeve
3 Nut sleeve
4 Thread
5 Ball groove
6 Outer ridge
7 Inner ridge
8 Groove
9 Through-hole
10 Inner hole
11 Outer hole
12 Radial flange
13 Radial flange
14 Die
15 Groove on the die side
16 Forming tool
17 Thread former
18 Formed edge section
19 Ball inlet ramp
20 Clamping section
21 Nut sleeve
22 Bearing ring
23 Connecting component
25 Socket
26 Bearing ring
27 Outer ring part
28 Ball groove
29 Tubular socket
30 Support ring
31 Nut sleeve
32 Sleeve part
33 Sleeve part

The invention claimed is:

1. A threaded nut of a ball screw drive, the threaded nut comprising:
an inner sleeve constructed of sheet metal, and
an outer sleeve constructed of sheet metal, the inner sleeve and outer sleeve nested axially in one another to form a nut sleeve having a thread, the thread helically wound about a longitudinal axis of the threaded nut and forming a ball groove on an inner circumference of the inner sleeve, and the outer sleeve having at least one outer hole along the thread, and a material of the inner sleeve is molded into the at least one outer hole.

2. The threaded nut of a ball screw drive according to claim 1 configured with a ball return, wherein the nut sleeve further comprises at least one through-hole configured for a return of balls along the thread, the at least one through-hole formed by the at least one outer hole of the outer sleeve and an inner hole of the inner sleeve, and a deformed edge section of the inner hole is molded into the outer hole.

3. The threaded nut according to claim 2, wherein the nut sleeve further comprises a ball inlet ramp formed by the deformed edge section at a transition from the ball groove to the through-hole.

4. The threaded nut according to claim 2, wherein the at least one outer hole on the outer sleeve is larger than inner hole on the inner sleeve.

5. The threaded nut according to claim 1, wherein the nut sleeve further comprises a connecting component arranged on at least one axial end.

6. The threaded nut according to claim 5, wherein the inner sleeve and the outer sleeve include sleeve parts arranged to be axially adjacent, and one of the sleeve parts is produced in one piece with the connecting component.

7. A method for producing the threaded nut according to claim 1, the method comprising:
provding the outer sleeve with the at least one outer hole,
nesting the inner sleeve and the outer sleeve as a nut sleeve,
inserting the nut sleeve into a die, an inner circumference of the die formed with a groove helically wound with a pitch about an axis of the die,
moving a forming tool into the nut sleeve and forming the thread helically wound about the longitudinal axis in the nut sleeve, the thread forming the ball groove of the threaded nut on the inner circumference of the inner sleeve,
molding, with the forming tool, material of the inner sleeve into the at least one outer hole of the outer sleeve.

8. The method according to claim 7, further comprising after forming the thread:
punching or cutting at least one inner hole into the inner sleeve such that the at least one outer hole of the outer sleeve and the at least one inner hole of the inner sleeve form at least one through-hole.

9. The method according to claim 8, wherein a deformed edge section of the at least one inner hole forms a ball inlet ramp.

10. A threaded nut of a ball screw drive, the threaded nut comprising:
an inner sleeve constructed of sheet metal, and
an outer sleeve constructed of sheet metal, the inner sleeve and the outer sleeve nested axially in one another to form a nut sleeve having a thread, the thread helically wound about a longitudinal axis of the threaded nut and forming a ball groove on an inner circumference of the inner sleeve, and
the outer sleeve having an outer hole along the thread, and a material of the inner sleeve extends into the outer hole.

11. The threaded nut according to claim 10, wherein the inner sleeve further comprises an inner hole, and a portion of the inner hole extends into the outer hole.

12. The threaded nut according to claim 11, wherein the inner hole and the outer hole form a through-hole.

13. The threaded nut according to claim 10, wherein the nut sleeve further comprises:
a helically wound inner ridge arranged on an outer circumference of the inner sleeve, and
a helically wound groove arranged on an inner circumference of the outer sleeve, and
the helically wound inner ridge engages the helically wound groove engages the helically wound inner ridge.

14. A method for producing a threaded nut, the method comprising:
providing an outer sleeve constructed of sheet metal, the outer sleeve having an outer hole,
providing an inner sleeve constructed of sheet metal,
inserting the inner sleeve within the outer sleeve to form a nut sleeve,
inserting the nut sleeve into a die,
moving a forming tool into the nut sleeve so as to simultaneously form: i) a helically wound ball groove on an inner circumference of the inner sleeve, ii) a helically wound inner ridge on an outer circumference of the inner sleeve, the helically wound inner ridge formed within the outer hole of the outer sleeve, and iii) a helically wound groove on an inner circumference of the outer sleeve, the helically wound groove engaged with the helically wound inner ridge.

15. The method for producing the threaded nut according to claim 14, wherein moving the forming tool into the nut sleeve also simultaneously forms a helically wound outer ridge on an outer circumference of the outer sleeve, the outer ridge formed via grooves arranged on the die.

16. The method for producing the threaded nut according to claim 14, further comprising after simultaneously forming the helically wound ball groove, the helically wound inner ridge, and the helically wound groove:
punching or cutting an inner hole into the inner sleeve so that the inner hole and the outer hole form a through-hole.

17. The method for producing the threaded nut according to claim 16, wherein a deformed edge section of the inner hole forms a ball inlet ramp.

18. The method for producing the threaded nut according to claim 16, wherein the inner hole is smaller than the outer hole.

19. The method for producing the threaded nut according to claim 16, wherein one of the inner sleeve or the outer sleeve includes a bearing ring.

20. The method for producing the threaded nut according to claim 19, wherein a remaining one of the inner sleeve or the outer sleeve includes an integrally formed support ring configured to radially support the bearing ring.

* * * * *